March 9, 1954  J. W. RUNDT  2,671,568
ARTICLE ALIGNING MECHANISM
Filed Nov. 13, 1950 2 Sheets-Sheet 1
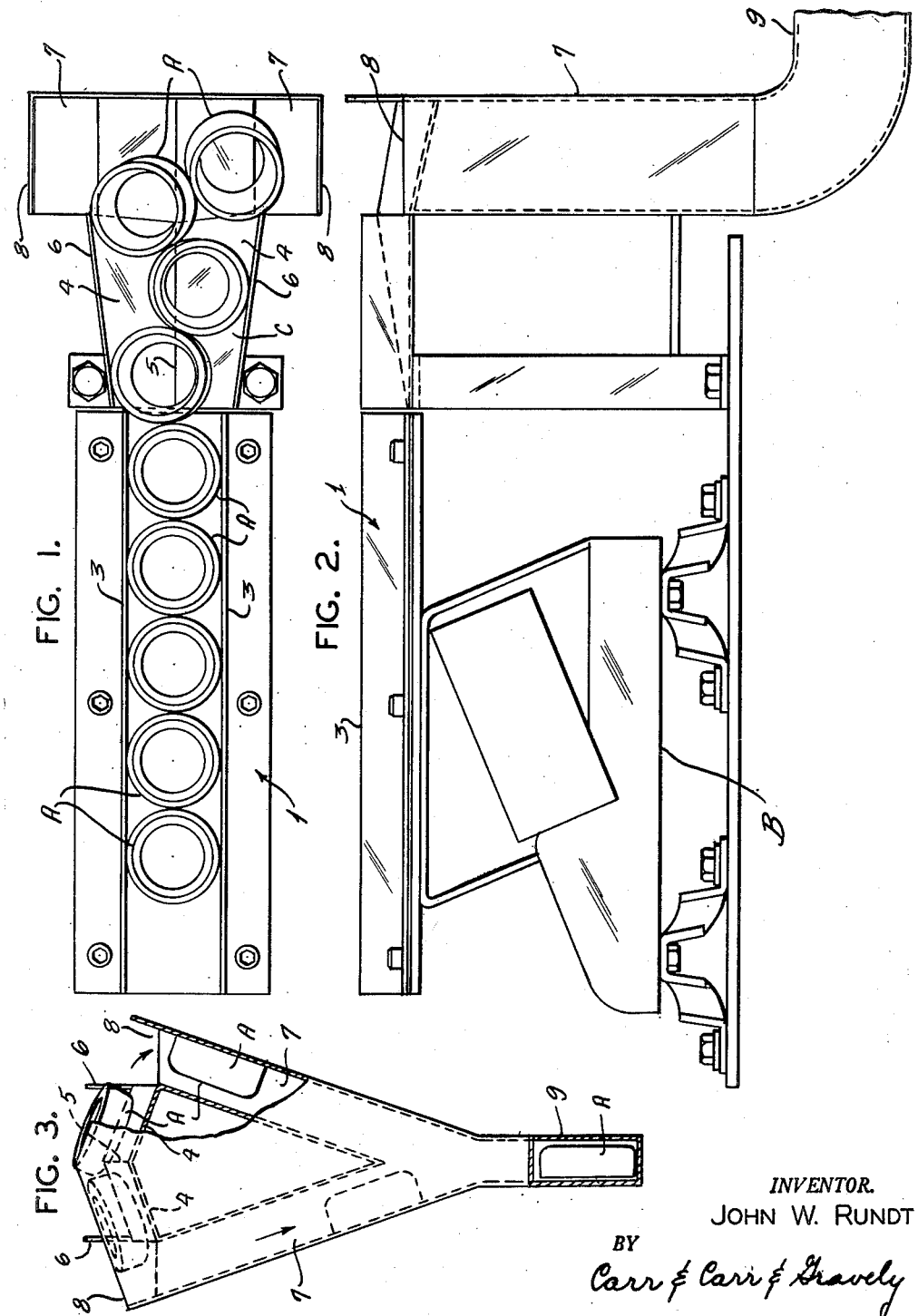
INVENTOR.
JOHN W. RUNDT
BY
Carr & Carr & Gravely
ATTORNEYS.

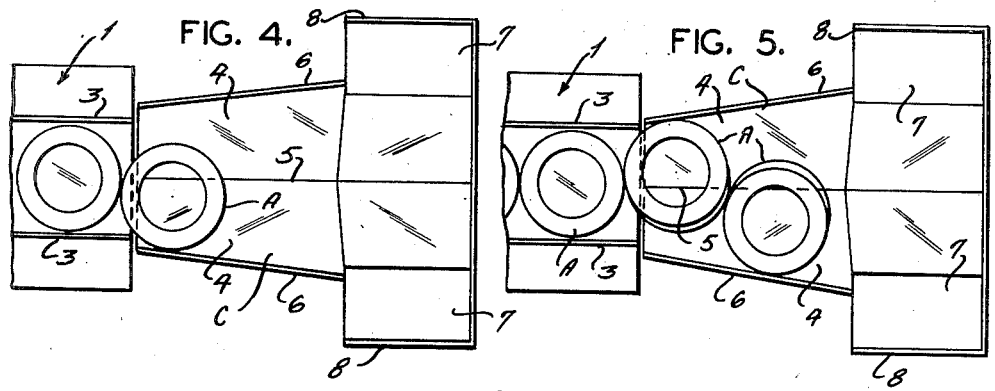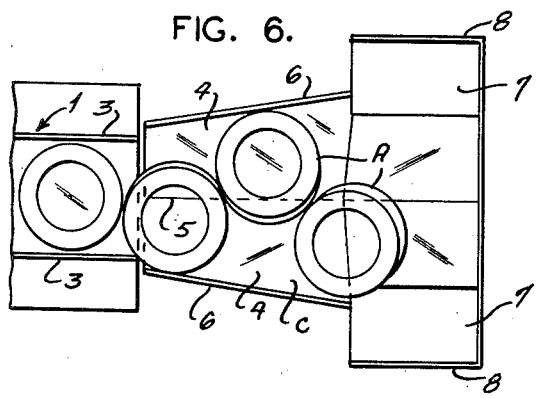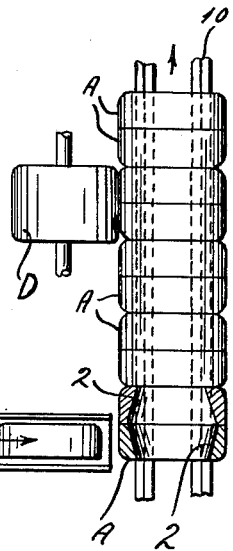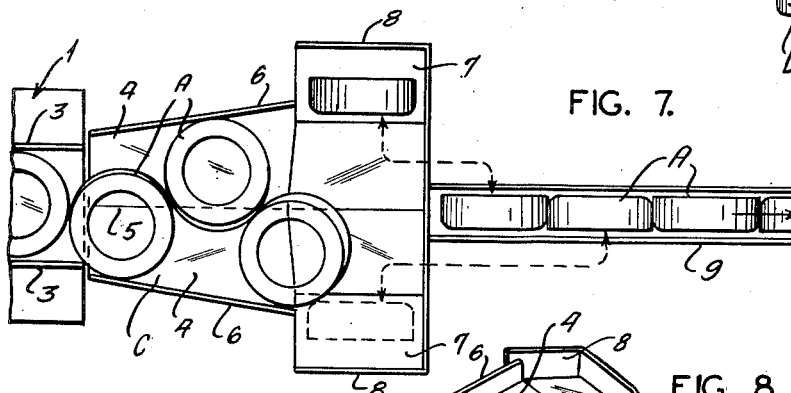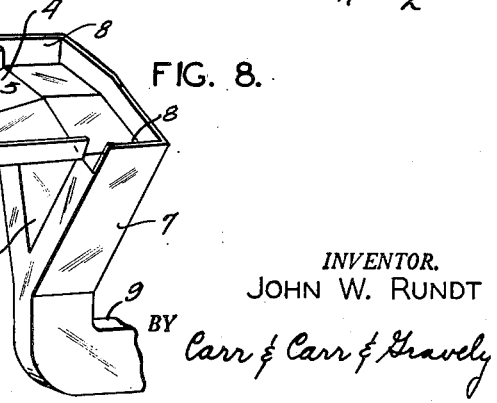

Patented Mar. 9, 1954

2,671,568

UNITED STATES PATENT OFFICE 2,671,568

ARTICLE ALIGNING MECHANISM

John W. Rundt, Canton, Ohio, assignor to The Timken Roller Bearing Company, Canton, Ohio, a corporation of Ohio Application November 13, 1950, Serial No. 195,419

10 Claims. (Cl. 214—7)

This invention relates broadly to a mechanism for positioning articles which have unlike front and rear faces, and upon which a work operation was previously performed, into such an aligned relation that the like faces of the adjacently consecutive articles are in planar abutment.

In the manufacture of annular anti-friction bearing cups, on a production line assembly basis, the cups go through various machining stages. One of the later steps is that of grinding the outer peripheral surfaces of said cups to a predetermined diametrical size. These cups have a tapered bore therethrough, making their front and rear faces unlike, and thereby permitting a slight nesting of the cups one within the other, when arranged in axial abutment with their unlike faces superimposed against one another.

Cups so nested can not be maintained in axial alignment, no matter how tightly packed, so that passage through the grinding wheels would not insure that the outside diameters of all the cups would be uniform and constant.

In order to insure a predetermined and correct exterior grinding, it is of utmost necessity that said cups be held solidly against one another, without any possibility of their coming out of axial alignment, and the principal object of this invention is to produce a mechanism which will attain that result.

Another important object of my invention is to construct a mechanism whereby the cups will be fed in single file and in sequence from a previously performed work operation, with their like faces uppermost, and will be oriented and tilted as they advance forwardly, and be finally positioned in axial alignment with their opposed faces in back-to-back and front-to-front abutment, so as to present a substantially solid and stable cylindrical surface for unswerving passage through the grinding machine.

Another object of the invention is to so construct a device of the kind described wherein the cups will be forcibly advanced while in peripheral contact and with their like faces uppermost, along a platform that is approximately an inverted V-shape in vertical cross section and arranged along the path of travel of said cups, so that the cups slide along the longitudinal ridge or apex of the V of the platform, to tilt the cups laterally through an angle to the horizontal.

A further object of my invention is to so construct said platform that said lateral inclination increases in steepness toward the forward end of the platform, to thereby tilt said cups increasingly and shift their axes toward the horizontal.

A still further object of the invention is to so construct said platform that it will divergently increase in width from its intake toward its discharge end, from approximately the width of a single cup to a width slightly less than twice the width of a cup, the outer bounding sides of said platform defining said increasing lateral width so that the adjacent cups slidably traveling in edge-to-edge contact along said ridge will be guided obliquely along said platform alternately to the opposite sides of the platform.

A still further object of my invention is to so construct said platform that it is not only inclined laterally to both side edges, but also is directed upwardly from its intake end, so that the cups are not moved by gravity but solely through the feeding pressure from behind, thus insuring the movement of successive cups in opposite lateral directions.

Another object of my invention is to provide means at the forward end of travel on said platform for guiding the forward cups from the opposite sides, dropping them from said platform and directing them so that they roll away on edge, one after the other, in single file, the adjacent cups having their unlike faces contiguous, and with cooperating means that will actuate the foremost on-ended cups, one at a time, into an axial alignment, so that the like faces of said cups are in close and solid abutment for travel through the grinding machine that will smooth and finish their outer peripheries.

Other objects of the invention are to so construct a device of the kind described, that will be able to handle said cups automatically and continuously and as fast as the cups are fed to it, to provide a conveyor system that is positive and dependable in its operation, that will be comprised of a minimum number of parts, be long-lasting, simple to make and operate, and which will be otherwise satisfactory and efficient for use wherever deemed applicable.

Many other objects and advantages of the construction herein shown and described and the method employed, will be obvious to those skilled in the art to which this invention appertains, as will be clearly shown from the disclosures herein given.

To this end my invention consists in the novel construction, arrangements and combinations of parts hereinafter described and claimed. In the accompanying drawings which form part of this specification and wherein like reference characters indicate like or corresponding parts wherever they occur:

Figure 1 is a top plan view of a portion of the device, showing the cups as deposited thereon from a previous work operation, and conveyed therealong in sequence, Figure 2 is a side elevational view thereof, Figure 3 is an end elevational view of the drop chutes, with portions in cross-section, Figures 4, 5 and 6 are fragmentary top plan views illustrating progressive advancement of the cups, Figure 7 is a fragmentary top plan view showing the further travel of said cups, and Figure 8 is a perspective view showing a portion of the twin drop chutes for the cups.

Referring more particularly to the drawings, wherein I have illustrated a preferred embodiment of my invention, there is shown a mechanism for continuously feeding roller bearing cups A automatically and continuously one after the other, from a previous work operation, and having them exit in proper position for passage through a grinding machine that will finish their outer diameters to a uniform predetermined size.

It may be mentioned at this point that the bearing cups A have a tapered bore 2 therethrough and that although the front faces of the cups are relatively straight across and lie in a plane, the rear or back faces of the cups have a rounded corner, somewhat as shown; hence, said front and back faces are not alike.

The cups are so designed that the large end of the bore at what may be termed the front face permits the back face of an adjacent superimposed cup to enter slightly thereinto, or nest. If a column of cups in axial abutment, and partially nested, were passed through the grinding machine to finish the outer diameters, such column would not hold steady and would be unstable. Therefore, the cups would be quite likely to be ground with their outer diameters not square relative to their front and back faces.

A length of conveyor 1, having opposed side flanges 3 extending lengthwise thereof to define its width, is adapted to receive the bearing cups A as said cups come from said previous work operation, said cups traveling along said conveyor with their like faces uppermost.

Any desired means may be provided for forcing said cups forwardly along said conveyor, as for example, by well-known vibrating device B that will engage beneath said conveyor and force the articles along the latter. The side flanges 3 may be spaced apart a distance slightly greater than the width of said cups so as to provide a slight clearance, and the cups will be advanced approximately in a horizontal plane along said conveyor with their front faces uppermost.

An alternator mechanism is arranged at the forward end of said conveyor to receive the cups in sequence therefrom and to tilt the adjacently consecutive cups alternately to either side, and convey said cups thus tilted, to a predetermined station, as will be hereinafter described.

A pair of plates 4 is arranged to extend longitudinally of the path of movement of said cups from the conveyor to form a platform C, along which the cups advance.

Each of said plates is inclined so that the platform will be approximately of inverted V-shape. The inner side edges of the plates 4 are progressively higher than their corresponding outer side edges in the direction away from the conveyor 1, whereby the inner edges form a ridge 5 extending linearly of the platform intermediate its bounding side edges.

It is to be noted that the plates 4 gradually become laterally steeper as they extend forwardly away from the conveyor and the ridge 5 becomes sharper and higher. The side flanges 6 extend along the outer side edges of said platform to define the width of the latter, the plates 6 being mutually divergent as they extend forwardly, so as to gradually increase the width of said platform C.

Although the intake end of said platform C is of a width equal to or slightly greater than the width of the conveyor 1, this width increases sufficiently greatly so that the width across the forward end of the platform is slightly less than twice the width of a cup. A pair of chutes 7 is arranged to communicate at their upper ends 8 with the forward portion of the platform at both sides thereof, and lead downwardly therefrom to a common exit chute 9 of a width slightly greater than the thickness or height of said cups.

In operation, the cups are forcibly advanced in edge-to-edge contact with their front faces uppermost along the conveyor 1 and pass through the alternator platform C, but inasmuch as said platform is wider than the conveyor and includes a ridge down its center, the cups will tend to shift to one side or the other on said platform.

This shifting is guided and controlled by the ridge down the center and the increasing width of the alternator C, plus the forcing of the cups through the alternator. Because the plates 4 of the alternator C and the ridge 5 formed thereby, are directed upwardly away from the end of the conveyor, and the alternator is not actuated by the vibrator B, the cups are moved onto and through the alternator C solely by the force of the cups in back of them which are on the actuated conveyor.

As shown more particularly in Figs. 4 to 6, the first cup onto the alternator passes to either one side or the other of the ridge 5, and bears against the side flange 6 on that side. Thus, as it is pushed further into the alternator by the cup in back of it, the center of the first cup moves further to one side of the ridge 5 and the center of the propelling cup immediately in back of it, the propelling cup remaining centered with respect to the ridge 5 while it is on the conveyor 1. When the second cup leaves the conveyor 1 (Fig. 5), its center is offset from the center of the first cup so that the latter cams the second cup toward the opposite side of the ridge 5 as the second cup is pushed onto the alternator C by the cup in back of it. Stating it differently, the second cup is wedged between the first cup which tends to remain stationary on the alternator because of friction and the force of gravity, and the third cup which is being forced forward by the rows of cups in back of it. Because the center of the second cup is offset from an imaginary line passing through the centers of the first and third cups, the second cup will be "squeezed" or cammed toward the side of the ridge 5 opposite to the position of the first cup (Fig. 5). Thus as the cups advance successively along the alternator or platform, and slide along said ridge, one cup of any adjacent pair of cups will be forced laterally of said ridge while the next adjacent cup will be forced laterally to the opposite side of the ridge. As said cups travel forwardly along said platform with their front faces uppermost and their axes approximately vertical, the cups will be gradually tilted by reason of the laterally inclined steepness of the platform, shiftably bringing the axes of the cups toward the horizontal, until the foremost cup is about ready to drop through the opening 8 in one of the chutes 7. The cup drops through said chute approximately while on edge and rolls along the exit chute 9 in said position, as shown.

The plate width, and the depth of cup drop, are so calculated that one cup will drop into the exit chute and roll away before the next following cup enters the other chute and drops. Fig. 7 indicates by the dotted line arrows, the positioning of the cups as they drop in sequence into the exit chute. As each cup approaches the chute opening through which it is about to drop, it is spaced ahead of the next cup on the same side of the chute and contacts only the leading or forward cup on the opposite side (see Figs. 6 and 7), and this spacing automatically creates a time interval for each cup to drop through the chute and enter the exit chute, ahead of the cup from the other side.

To assure that the cups do not fall into the pair of vertical chutes before the bottom of the same is clear, any preferred form of safety section (not shown) may be provided adjacent the intake end of the exit chute, as a control to temporarily stop the flow of cups on the conveyor 1.

As the cups roll along the exit chute 9 in sequence, it will be noted that adjacent cups have such relationship that the front face of one of them is contiguous to the rear face of the next, so that said unlike faces lie in approximately the same plane. In order to feed said cups to the grinding machine D so as to travel therepast in a straight line in solid axial alignment, without likelihood of lateral displacement during such feeding and grinding, the foremost cups are actuated one at a time, in sequence, onto a straight line conveyor means 10 of conventional construction approximately in an axial direction as they exit from said exit chute.

Thus it will be seen that the front face of any one cup is superimposed flat against the front face of the next succeeding cup, and the back face of said last mentioned cup is superimposed flatly against the back face of the cup next following, and so on, so that all adjacent cups are similarly superimposed. All of said cups thus actuated into axial alignment will be substantially in solid axial abutment on the conveyor 10 for passage through the grinding wheels, to thereby finish their outer diameters to a constantly uniform and predetermined size.

What I claim is:

1. In a mechanism of the kind described and in combination, an article-supporting platform having an inlet and including a pair of cooperating inverted V-shaped slides meeting to form an elongated ridge extending therebetween, the ridge extending upwardly away from the inlet, laterally divergent side edges defining the width of said platform, and means to forcibly advance consecutive articles that are in peripheral contact slidably forwardly along said ridge whereby successive articles will be shifted obliquely toward the opposite side edges of said platform.

2. In a mechanism of the kind described, an article-supporting platform having an inlet and including a pair of laterally adjoining inverted V-shaped slides that provide an elongated ridge intermediate the width of said platform, the ridge extending upwardly away from the inlet, laterally divergent guiding edges defining the side edges of said platform, means to forcibly advance a series of articles successively forwardly along said ridge while said articles are in edge-to-edge contact whereby adjacent articles engage said guiding edges to shift laterally in opposite directions as they advance forwardly, and means at the forward end of said platform for receiving said articles alternately from said opposite sides of said platform.

3. In a device of the kind described, an annuli receiving supporting platform having an intake end of substantially the width of an annulus and including a pair of upwardly directed longitudinally contiguous floors that are inclined laterally to the horizontal so as to provide an elongated ridge intermediate the sides of said platform, laterally divergent flanges along the outer sides of said floors to define the width of said platform, means to press consecutive annuli in peripheral contact forwardly and upwardly along said ridge and in peripheral contact with said flanges, whereby alternate ones of said annuli will be guided obliquely to opposite sides of said platform, and means to guide the forward annuli from alternately opposite sides to a point below said platform.

4. A device of the kind described in claim 1 in which the lateral inclination of said floors increases in steepness toward the forward end of the platform.

5. In a mechanism of the kind described, a collar supporting platform including a pair of floors meeting lengthwise to form an elongated ridge, laterally divergent bounding means along the sides of said platform to define its width, means for forcibly advancing consecutive collars while in peripheral contact slidably forwardly along said ridge from a position in which their axes extend vertically, and tilting said collars so that their axes are shifted toward the horizontal, means for delivering said tilted collars to a point below the platform from alternate sides of said platform into alignment edge-to-edge, and means for actuating the foremost collars successively into axial alignment.

6. In a device for handling approximately annular articles having unlike front and rear faces so that they are aligned axially in like-face abutment, and including a pair of longitudinally extending mutually laterally inclined floors forming a platform member provided with a meeting ridge intermediate the sides, the width of said platform and the steepness of said floors increasing toward the forward end, means for feeding said articles forwardly in succession in peripheral contact and with like faces uppermost, a pair of downwardly directed chutes leading from the opposite sides of said forward end of the platform for alternately receiving consecutive articles, and means for consecutively actuating the foremost articles in succession alternately from the chutes into axial alignment.

7. In a device of the kind described for handling annular articles having unlike front and back faces so that they are positioned in axial alignment with adjacent articles back-to-back and front-to-front, means for actuating said articles in single file with their peripheral edges abutting and with their like faces uppermost, a pair of longitudinally extending mutually laterally inclined floors forming a platform having its intake end communicating with the forward end of said actuating means and being laterally enlarged toward the other end thereof whereby successive articles are forced obliquely forward to the alternately opposite sides of said platform and tilted laterally, and means for conducting said articles downwardly from the alternate sides of said last-mentioned end of said platform and arranging them into axial alignment with their like faces in abutment.

8. A device of the type described for handling articles having unlike front and back faces, comprising means for forcibly advancing such articles in single file with like faces uppermost; means for shifting successive articles laterally in opposite directions during their advancement and tilting them so like faces are facing in opposite directions; means for successively receiving the articles in endwise relationship; and means for axially aligning them with like faces in abutment.

9. A device of the type described for handling articles having unlike opposed faces, comprising means for forcibly advancing such articles in single file with like faces facing downwardly; and means for receiving the articles from the advancing means and separating successive articles including a pair of laterally adjoining slides having a ridge therebetween, the separating means having an inlet of substantially the same width as the articles being handled and increasing in width away from the inlet, and means adjacent the inlet limiting the lateral movement of the articles passing into the separating means, the separating means being constructed to prevent the articles from passing therethrough without external forces being applied against them whereby the articles must be forced through the separating means along the ridge by the articles in back of them which are moved by the forcibly advancing means.

10. A device of the type described for handling articles having unlike opposed faces, comprising means for forcibly advancing such articles in single file with like faces facing downwardly; and means for receiving the articles from the advancing means and separating successive articles including a pair of laterally adjoining slides having a ridge therebetween, the ridge extending upwardly away from the advancing means whereby the articles must be pushed along it by the following articles moved by the advancing means, the separating means having an inlet of substantially the same width as the articles being handled and increasing in width away from the inlet, and means adjacent the inlet limiting the lateral movement of the articles passing into the separating means.

JOHN W. RUNDT.

References Cited in the file of this patent
UNITED STATES PATENTS

| Number | Name | Date |
| --- | --- | --- |
| 1,456,216 | Brightman | May 22, 1923 |
| 1,551,614 | Paridon | Sept. 1, 1925 |
| 2,566,417 | Holm | Sept. 4, 1951 |